United States Patent [19]

Buchroeder

[11] Patent Number: 4,842,394

[45] Date of Patent: Jun. 27, 1989

[54] SIMPLIFIED HIGH SPEED CORRECTED PROJECTION LENS SYSTEM FOR CURVED IMAGE SURFACES

[75] Inventor: Richard A. Buchroeder, Tucson, Ariz.

[73] Assignee: TDS Patent Management, Inc., Scarsdale, N.Y.

[21] Appl. No.: 160,783

[22] Filed: Feb. 18, 1988

[51] Int. Cl.$^4$ .................. G02B 13/18; G02B 27/18
[52] U.S. Cl. ................................ 350/432; 350/412
[58] Field of Search ................................ 350/432

[56] References Cited

U.S. PATENT DOCUMENTS 2,346,810  4/1944  Young ........................... 350/276 R
2,377,268  5/1945  Rinia ............................ 350/432
4,249,205  2/1981  Buchroeder .................. 350/443
4,457,592  7/1984  Baker ........................... 350/432
4,595,263  6/1986  Clarke .......................... 350/432

Primary Examiner—Bruce Y. Arnold
Assistant Examiner—Rebecca D. Gass
Attorney, Agent, or Firm—Pollock, Vande Sande & Priddy

[57] ABSTRACT

A multiple element lens system for projecting images generated from curved surfaces. A spherical projection lens is provided along a projection axis. An aspheric plate follows the spherical lens, which is followed by a second spherical projection lens. Parfocalizing separate curved image surfaces of different primary colors permits a narrow spectral bandwidth lens system, having an improved speed and resolution, providing combined full color projected images.

9 Claims, 3 Drawing Sheets

Aspheric: $X = Y^2/(2 \times 22.4409) + Y^4(-.1645917E-2) + Y^6(-.333027E-4) + Y^8(.276925E-6) + Y^{10}(-.396046E-7)$ (inches)

6.725" min. aper.

7.200 $^{+0}_{-.005}$ O.D.

DIMENSIONS IN INCHES

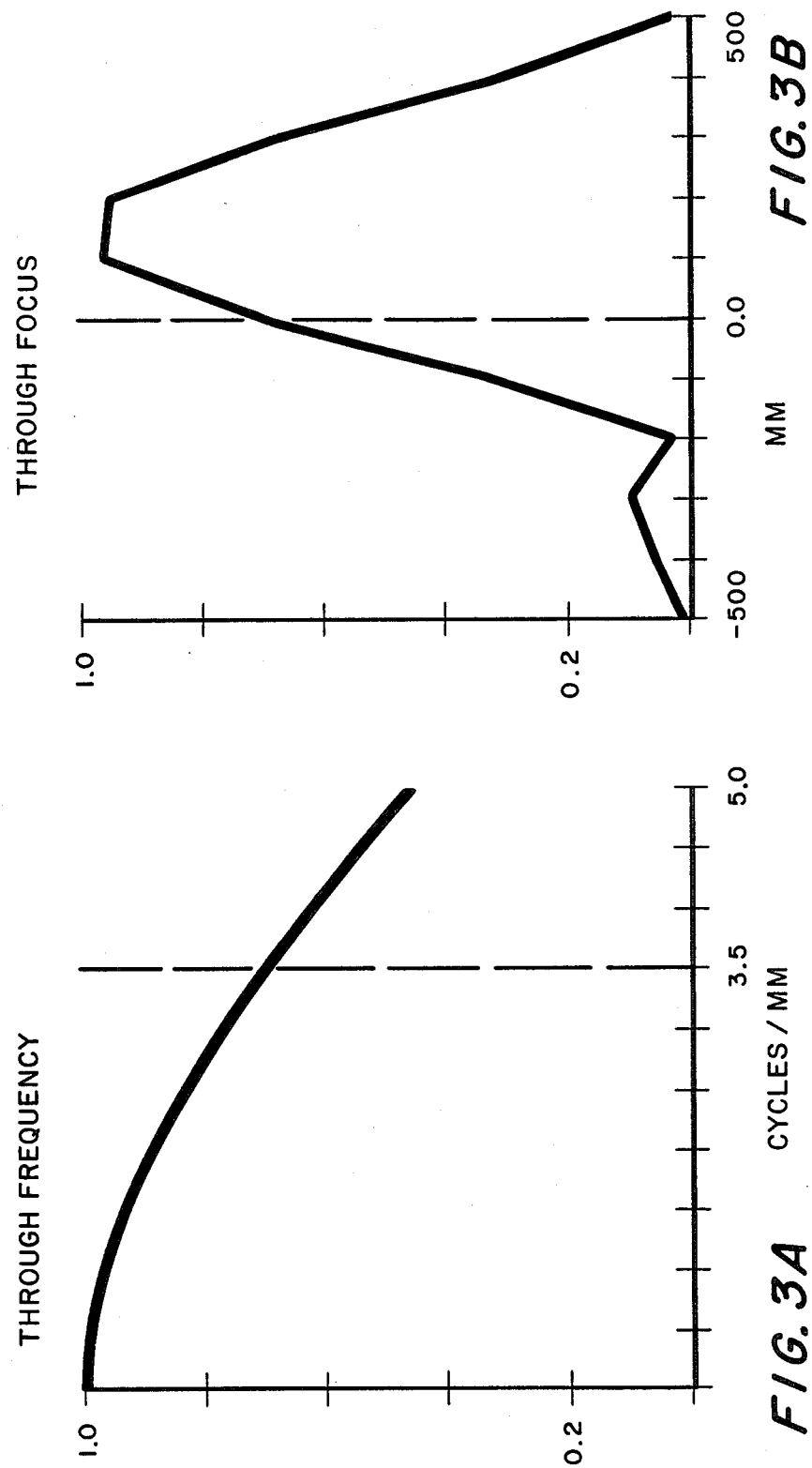

SIMPLIFIED HIGH SPEED CORRECTED PROJECTION LENS SYSTEM FOR CURVED IMAGE SURFACES

BACKGROUND OF THE INVENTION

The present invention relates to lens system for projecting television images. Specifically, a multiple element lens system is employed using a single aspheric element for projecting images which lie on a curved image surface.

Projection lenses and projection cathode ray tube systems for magnifying and projecting television images to distant screens are known. In the projection television art, efforts have been made to provide simplified, and hence low cost, projection lenses for magnifying and projecting color television images.

It is recognized, specifically in U.S. Pat. Nos. 4,249,205 and 4,595,263, that curved images provide certain advantages when designing a projection lens. Specifically, the number of optical elements are simplified because of the relaxed requirements for correction of images which lie on a curved image surface.

Each of the above-referenced patents describes a projection lens system wherein curved television images are generated from cathode ray tubes having spherical or aspherical surfaces. Light from more than one curved image surfaces is combined with a dichroic mirror assembly, coupled either through an immersion medium or by air to a single aperture for projection.

The curved image surfaces can be magnified using a projection lens system which has one or more aspheric elements for preserving image resolution, providing a highly corrected image. The aspheric surfaces permit preservation of high resolution, while allowing higher lens speed. The production of these aspheric surfaces has typically been done by imposing the aspheric surface on spherical substrates (in most circumstancs, glass has been used for the substrate). Considerable tedious and expensive efforts are required to ashperize the spherical surfaces, enhancing the cost of the finished lens system. In U.S. Pat. No. 4,595,263, several aspheric surfaces are employed for providing correction to the curved image generated from the spherical CRT surface.

Thus, it is clear that one way to reduce the costs of such projection lens systems is to reduce the number of required aspheric surfaces, and to produce the elements at a lower cost.

SUMMARY OF THE INVENTION

It is therefore an object of this invention to provide a simplified projection lens for television use having improved speed and resolution.

It is a more specific object of this invention to provide a projection lens for a curved image surface having a limited spectral bandwidth and a minimum number of aspheric elements.

It is yet another object of this invention to produce aspheric elements in a lens system at a minimum cost while preserving the overall resolution and speed of the lens system.

These and other objects are accomplished by a lens system which uses a single aspheric plate-like element and two spherical-surfaced elements. The lens system is arranged so that light from a curved image surface is received by a first spherical surfaced element. A single aspheric element next receives the light and transmits it to the remaining spherical surfaced element, resulting in a magnified projected image.

The lens system employs a single aspheric element. The aspheric element has at least one aspheric surface. The aspheric surface may be imposed on one or both sides of the plate. When both sides have identical shapes, simplicity in manufacturing may be obtained. Use of a single aspheric plate having a planar surface also provides numerous advantages from a manufacturing standpoint, while maintaining very high speed and stability through a focusing range. The resolution of the projected image is also of high quality relative to other projection lens systems using more than one aspheric element.

Preferably, the lens system operates in a three tube projection system, wherein each of the primary colors are generated by a single cathode ray tube. Each of the cathode ray tubes has a spherical or aspherical concave surface to generate a single spectral bandwidth image, which is combined with the remaining two images to form a third, composite image for projection. When a solid or immersion coupling medium is used, the image abberations are subject to partial cancellation due to the thickness of the immersion medium. Thus, the following lens system requires a lesser amount of correction which is achieved through the single aspheric plate.

BRIEF DESCRIPTION OF THE FIGURES

FIG. 3A illustrates the modulation transfer function for the optical assembly of FIG. 1 for frequencies up to 5 cycles per mm.

FIG. 3B illustrates the modulation transfer function for the assembly of FIG. 1 as the function of distance from the focal point.

DESCRIPTION OF THE PREFERRED EMBODIMENT

Figure 1:
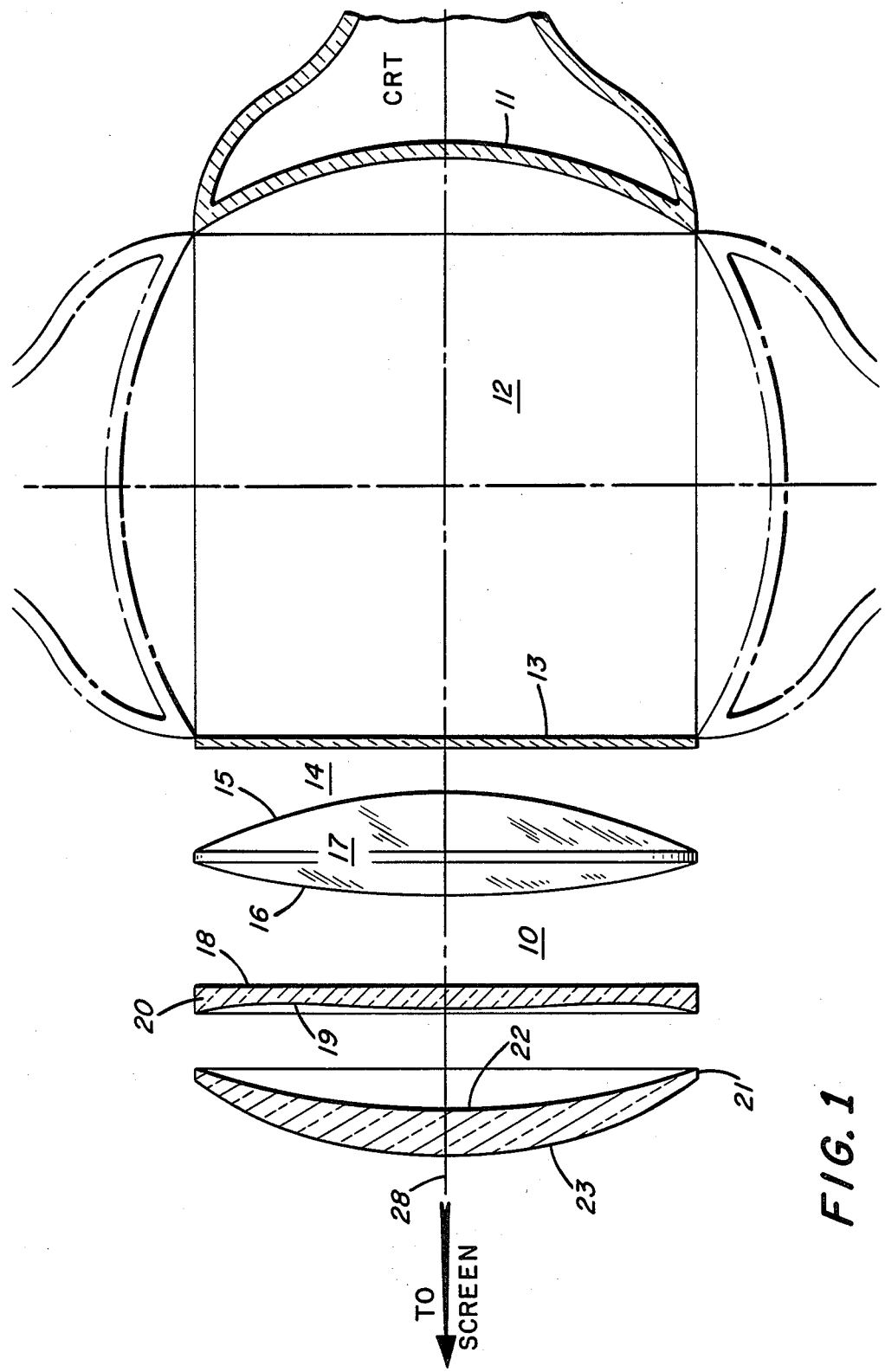
FIG. 1 illustrates the combination of a single aspheric plate with two spherical elements to provide a projection lens in accordance with one embodiment of the invention.

Referring to FIG. 1, there is shown a preferred embodiment of the invention for use with a source of curved imaged. This source of curved images can be, as is described in U.S. Pat. No. 4,249,205, a cathode ray tube having a concave image generating surface. Although a solid optical coupler is illustrated in the foregoing patent, the coupling between a clear window 13 and the surfaces of the cathode ray tube 11 may be by any fluid having an index of refraction which provides for a minimum of losses due to interfaces between surfaces. A fluid having an index of refraction of at least 1.4775 is adequate for this purpose. A window 13 is shown which faces the spherical surface 15 of a projection lens and spaced apart along the optical axis approximately 7 inches.

Although only one image generating surface 11 is shown, it it possible to include multiple image generating surfaces with crossed dichroic mirrors immersed in the fluid. The distance from each phosphor surface to the lens system 10 for each phosphor surface is adjusted to par-focalize the lens with respect to the different image generating surfaces. It is assumed that two additional image generating cathode ray tubes will be disposed orthogonal to the one shown such that images in the three primary colors or red, green and blue may be generated, combined with a set of dichoric mirrors and transmitted to the lens system 10. The individual phosphor generating surfaces are spaced apart from the lens system 10 at different distances to parfocalize the system. In this way, a lens system 10 of only limited bandwidth may be utilized.

The combined images are transmitted via the window or planar aperture 13 to the first spheric surface 15. The parfocalized assembly 10 comprises two spherical lens elements 17 and 21, and an aspheric plate 20.

The conventional spherical elements 17 and 21, which will be described in greater detail when the lens system prescription is described, provide for the magnification necessary for the particular throw distance selected for the system. In the embodiment shown, it is contemplated that a 5-inch CRT image diagonal will be projected to a 60-inch screen diagonal with a throw distance of 116 inches. The CRT image generating surface 11 would have a radius of 6.3 to 6.5 inches.

The aspheric plate 20 has a planar side 18 facing the spheric element 17. The opposite surface 19 is an aspheric surface, more particularly described by the polynomial $$X = Y^2/(2 \times 22.4409) + Y^4(-.164391E-2) + Y^6(-.333027E-4) + Y^8(.276925E-6) + Y^{10}(-.396046E-7)$$

The polynomial, as is known to skilled lens designers, describe the X and Y coordinates, vis a vis, the optical axis 28, such that an aspheric surface 19 is defined.

The required single aspheric plate can be manufactured from a single planar material which could be glass or from an acrylic sheet material. Standard optical fabrication techniques, such as polishing and grinding are possible given the planar nature of the substrate material. The planar sheet material is easier to work with than the previous spherical surfaces which were aspherized to generate the prior art aspheric elements. It is also possible to identically aspherize both sides of the sheet material, avoiding the necessity to aspherize a spherical surface as was done in prior art lens designs.

Each of the elements 17, 20 and 21 are separated by a corresponding air gap at distances which will be described with respect to the lens prescription. X represents the thickness of the plate 20 and Y the perpendicular distance from the axis 28.

The particular prescription for the embodiment of FIG. 1 is given below as follows:

| | | Wavelengths | .58760 | .48610 | .65630 | | |
|---|---|---|---|---|---|---|---|
| Surf | Radius(mm) | Thickness(mm) | Material | Index | V | Semi-AP | KAPPA |
| 23 | 162.8000 | 16.5100 | Schott Bak4 | 1.569 | 56.1 | 88.2 | |
| 22 | 277.3000 | 38.3700 | Air | | | 91.4 | |
| 19 | 581.6000 | 7.6200 | Schott K10 | 1.501 | 56.4 | 91.4 | −1.0000 |
| ASPH = | −.9859000E-07 | −.3060000E-11 | .4030000E-16 | −.9000000E-20 | | | |
| 18 | .0000 | 33.4500 | Air | | | 88.0 | |
| 16 | 330.6000 | 38.1000 | Schott Bak4 | 1.569 | 56.1 | 91.4 | |
| 15 | −202.0000 | 15.2400 | Air | | | 91.4 | |

This lens prescription indicates in the first column the surface identified by a reference numeral of FIG. 1. Additionally, a radius for the particular surface is given in column 2 of the table. The thickness along the optical axis 28 is given in column 3.

The distances between elements along the optical axis is also described in column 3. Column 4 indicates that the distance represents either the thickness of a particular element or the air gap between adjacent elements. The index of refraction and speed for the materials are also given in the above prescription.

The improved resolution for the lens assembly of FIG. 1 using the single aspheric plate, is illustrated more particularly with respect to FIG. 3A. FIG. 3A is the modulation transfer function which demonstrates the change in modulation transfer function versus cycles per millimeter of displayed lines for a given monochromatic image. Additionally, the change in modulation transfer function from the point of focus of the lens assembly with respect to the generated images for a fixed frequency of 3.5 cycles per millimeter is described in FIG. 3B. Those skilled in the art will recognize the modulation transfer function as indicating the ratio of intensity between black and white detail, which decreases from a maximum of 100%.

Figure 2:
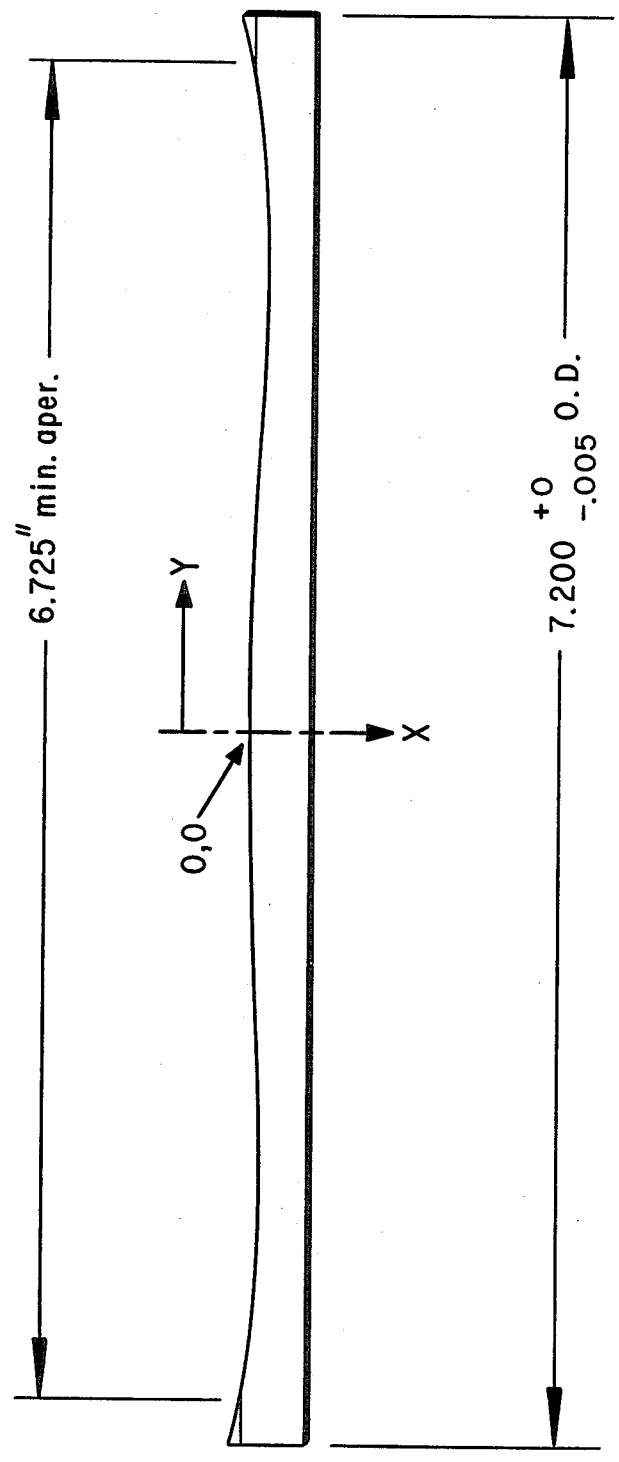
FIG. 2 demonstrates the aspheric surface of the aspheric plate, along with the requisite polynomial describing the surface.

Additional to the improvements in resolution as exemplified by the modulation transfer function, improvement in lens speed is realized. The lens systems of FIGS. 1 and 2 are capable of achieving a speed of F/0.95.

Thus, there is described with respect to one embodiment a multiple lens system having an improved resolution, yet only relying on a single aspheric plate. The foregoing lens system can be used with any image size and any image curvature by only modifying the prescription to take into account differences in image size and curvature. The basic simplified lens structure of three elements comprising two spherical lenses and a single aspheric element formed on a planar surface can be retained. The foregoing prescription is, of course, only exemplary for one image size, i.e., the five (5) inch CRT image size, having a radius of curvature of 1.2 to 2 times image diagonal. As is known in the art, image diagonal is the effective image size produced from each of the CRT elements. Those skilled in the art will recognize yet other embodiments described more particularly by the claims which follow.

What is claimed is:

1. A multiple element lens system for projecting images which are generated from a curved image projection surface, comprising:
   a first spherical projection lens having an axis which is coincident with an axis of said projection surface, and having an entrance aperture positioned to receive curved images from said curved image projection surface;
   a single aspheric plate having an optical axis coincident with said spherical projection lens, said aspheric plate having at least one aspheric surface imposed on a substantially planar surface;
   a second spherical projection lens facing said aspheric plate having an optical axis coincident with said aspheric plate optical axis.

2. The multiple element lens system of claim 1 wherein said aspheric surface is defined as:

$$X = Y^2/44.8818 + Y^4(-.1645917E\text{-}2) + Y^6(-.333027E\text{-}4) + Y^8(.276925E\text{-}6) + Y^{10}(-.396046E\text{-}7)$$

where X is the distance of the aspheric surface from a plane perpendicular to said axis, and Y is the perpendicular distance from said optical axis.

3. The multiple element lens system of claim 1 wherein said aspheric plate includes a second similar aspheric surface opposite said at least one aspheric surface.

4. A multiple element lens system for projecting images which are generated from a plurality of primary color curved image generating surfaces, each curved image generating surface being located at a distance which parfocalizes said images along a common optical axis comprising:
- a first spherical element located along said axis having an entrance aperture positioned to receive curved images from said image generating surfaces;
- a single aspheric plate having a planar surface facing said first spherical element and an opposite aspheric surface; and,
- a second spherical element located along said axis facing said aspheric surface, said first spherical element and aspheric surface forming with said second spherical element a projection lens of narrow spectral bandwidth.

5. The multiple element lens system of claim 4 wherein said first spherical element faces a planar aperture which faces said curved image generating surface.

6. The multiple element lens system of claim 4 wherein said first and second spherical elements are spaced apart by air from said aspheric plate.

7. The multiple element system of claim 4, wherein said aspheric plate is an acrylic plate having a planar side opposite said aspheric surface.

8. A multiple element lens system for projecting images which are generated from a plurality of primary color curved image generating surfaces, each curved image generating surface having an image projection axis orthogonal to the projection axis of an adjacent image generating surface comprising:
- liquid cooling means for coupling images from said image generating surfaces to an entrance aperture of a projection lens through a transparent window;
- a projection lens of narrow spectral bandwidth having an aperture positioned to receive images from said liquid coupling means, said projection lens comprising:
- a first spherical element facing said window and separated therefrom by an air interface;
- a single aspheric plate having an optical axis aligned with an optical axis of said first spherical lens, said aspheric plate having an aspheric surface imposed on a substantially planar surface; and,
- a second spherical element located along said optical axis.

9. The multiple element lens system of claim 8 wherein said aspheric plate has a planar surface facing said first spherical element, and said aspheric surface faces said second spherical element.

* * * * *